(12) United States Patent
Huang et al.

(10) Patent No.: US 7,239,061 B2
(45) Date of Patent: Jul. 3, 2007

(54) SWITCHING PATTERN AC INDUCTION MOTOR

(76) Inventors: Youguo Huang, No.6 Zhuodaoquan North Road, Wuchang Hongshan District, Wuhan City, Hubei Province (CN) 430079; Wei Huang, No.6 Zhuodaoquan North Road, Wuchang Hongshan District, Wuhan City, Hubei Province (CN) 430079

( * ) Notice: Subject to any disclaimer, the term of this patent is extended or adjusted under 35 U.S.C. 154(b) by 295 days.

(21) Appl. No.: 10/504,023

(22) PCT Filed: Jan. 9, 2003

(86) PCT No.: PCT/CN03/00017

§ 371 (c)(1),
(2), (4) Date: Sep. 24, 2004

(87) PCT Pub. No.: WO03/069762

PCT Pub. Date: Aug. 21, 2003

(65) Prior Publication Data

US 2005/0151438 A1    Jul. 14, 2005

(30) Foreign Application Priority Data

Feb. 9, 2002 (CN) ............... 02 1 15544
Feb. 9, 2002 (CN) ............... 02 2 28424

(51) Int. Cl.
*H02K 17/16* (2006.01)
*H02K 1/16* (2006.01)
*H02K 1/26* (2006.01)

(52) U.S. Cl. .............. 310/211; 310/180; 310/166; 318/727; 318/811

(58) Field of Classification Search ............. 310/166, 310/179, 180, 184, 211, 212; 318/727, 807, 318/811

See application file for complete search history.

(56) References Cited

U.S. PATENT DOCUMENTS 4,371,802 A * 2/1983 Morrill .............. 310/166
4,384,244 A * 5/1983 Matsumoto .......... 318/803

(Continued)

FOREIGN PATENT DOCUMENTS

EP    0058352    *    8/1982

(Continued)

OTHER PUBLICATIONS

Handbook of Electrical Motors; Engelmann and Middendorf; Marcel Dekker, Inc. pp. 284-286, Jan. 1995.*

*Primary Examiner*—Karl Eizo Tamai
(74) *Attorney, Agent, or Firm*—Birch, Stewart, Kolasch & Birch, LLP

(57) ABSTRACT

Both the stator core and the rotor core of a switching pattern AC induction motor are fabricated by soft magnetic material laminations or ferrite material, etc., both of which have corresponding frequency characteristic. The rotor is a squirrel cage rotor. Switching pattern excitation is adopted in the stator pole, of which the excitation voltage is sine wave pulse width modulated or sine wave pulse amplitude modulated within the frequency range of voice and ultrasonic. Under the condition of the same power output, the present motor reduces its size and mass to a fraction of or tenth of that of an ordinary one. Meanwhile, it reduces the cost of manufacture. It realizes stepless speed regulating from zero to several thousand rpm while keeping well mechanical characteristic performance.

7 Claims, 15 Drawing Sheets

U.S. PATENT DOCUMENTS

| | | | |
|---|---|---|---|
| 4,442,368 A * | 4/1984 | Kupisiewicz et al. | 310/201 |
| 4,562,397 A * | 12/1985 | Kitabayashi et al. | 318/814 |
| 4,672,286 A * | 6/1987 | Williams | 318/798 |
| 5,471,101 A * | 11/1995 | Hein | 310/42 |
| 5,565,752 A | 10/1996 | Lorenz | 318/807 |
| 5,869,915 A | 2/1999 | Blake | 310/182 |
| 5,911,453 A | 6/1999 | Boyd | 29/596 |
| 2005/0151438 A1 * | 7/2005 | Huang et al. | 310/180 |

FOREIGN PATENT DOCUMENTS

| | | | |
|---|---|---|---|
| EP | 0058352 A1 | | 8/1982 |
| EP | 0583994 | * | 7/1993 |

* cited by examiner

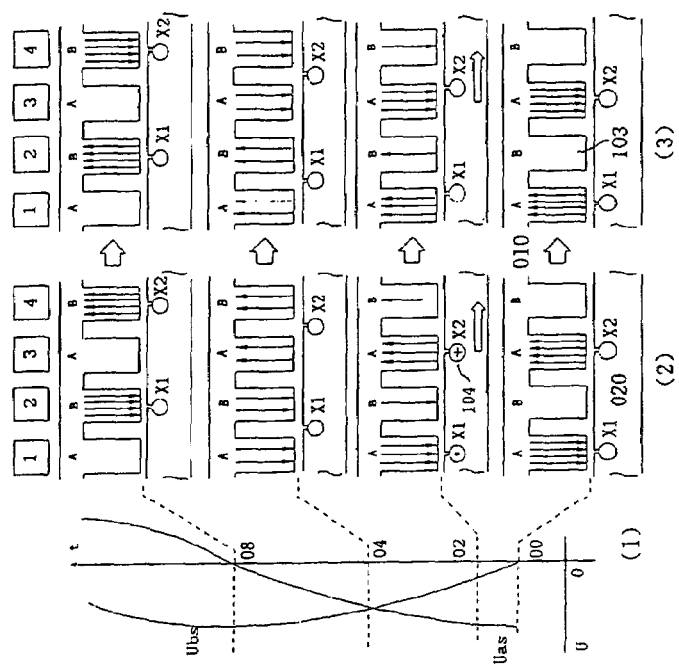
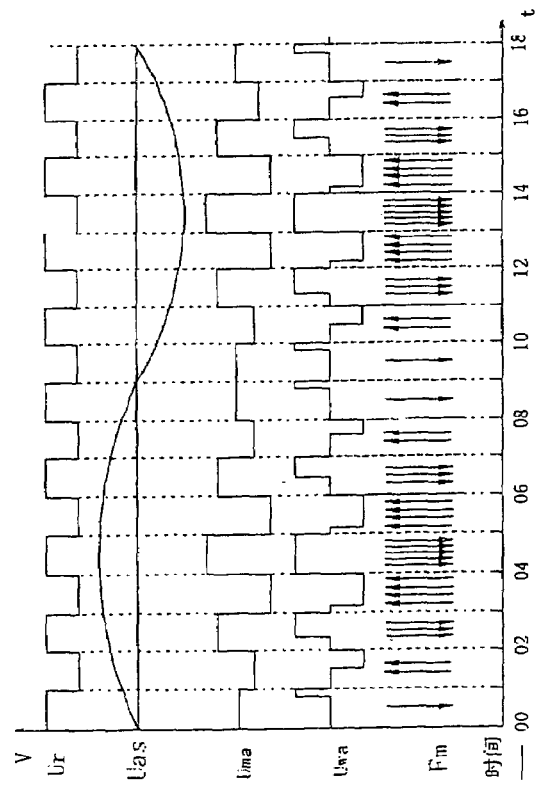
Fig. 5B
Fig. 5A

SWITCHING PATTERN AC INDUCTION MOTOR

TECHNICAL FIELD

The present invention relates to a novel motor, more particularly, to a switching pattern AC induction motor within the frequency range of voice and ultrasonic.

BACKGROUND ART

Existing AC induction motor, which is mainly squirrel cage type AC asynchronous induction motor, has the advantages of simple structure, low cost and larger output torque as compared with brush DC motor. Such a motor is typically excited with continuous two phases of sine wave voltages with a phase difference of 90° or three phases of sine wave voltages with a phase difference of 120°. A continuous sine wave rotating magnetic field is generated in the air gap between the stator and the rotor, which causes the squirrel cage type rotor rotating. The rotating speed of the motor can be approximately calculated by the rotating speed formula for the rotating magnetic field: $n=60*f1/p$, where p is the number of pole pairs of the stator in the motor, f1 is the frequency of the excitation AC. It can be seen that, with the structure of the motor fixed, the rotating speed is mainly determined by the frequency f1. Thus, an effective way to control the rotating speed is to vary the excitation AC frequency f1. For example, supposing the number of pole pairs in the motor is p=2, the rotating speed per minute is $n=1500$ r/min when the excitation AC frequency $f1=50$ Hertz; the rotating speed is $n=1200$ r/min when $f1=40$ Hertz, and so on. For this reason, a plurality of methods of controlling the speed have been developed, such as frequency-converting speed regulating and vector-controlling speed regulating, etc. However, since the actually required operating speed is typically much lower than the rotating speed of the motor, and because of the resistance characteristic of the excitation windings and the torque requirement of the motor, such as the torque of the AC asynchronous motor is somewhat low during low-speed running, sometimes a lower rotating speed can not be obtained by decreasing the excitation AC frequency f1 without limitation. Therefore, it is often required to em example, mechanical gears to vary speed, so as to meet various requirements in actual usage. In this way, the cost, size and weight of the apparatus are undoubtedly increased, and the effect is not satisfying.

In the recent twenty to thirty years, permanent magnetic brushless DC motor, step motor and switching reluctance motor, which can be generally referred to as electronic electromotor or electronic motor, are invented and widely used. Mostly, their running principle is to rotate the rotor by alternatively using the attraction force or repulsion force generated between the poles with the different polarity by control technology. This kind of motor has apparent improvement in aspects of speed regulating, the size and the weight, but the cost of manufacture, the speed regulating range and the output torque still do not meet the increasing requirements for higher performance.

SUMMARY OF THE INVENTION

The technical problems to be solved in the present invention are:

First, such a novel motor should have larger power density, that is to say, under the condition of equivalent output power, the size and mass of the motor is reduced to a fraction of or tenth of that of an existing one.

Second, such a novel motor has larger range of speed regulation as compared with existing motors, the output speed thereof can be continuously stepless adjusted between the rating rotating speed of thousands of circles per minute and zero rotating speed, the manufacturing cost is cheaper, the size and mass is very small, and the speed can be changed without gears while keeping constant torque.

The technical solution adopted to solve the above technical problems in the present invention is:

Such a motor is achieved by adopting the AC electromagnetic induction technique with switching frequency within the frequency range of voice and ultrasonic, thus, it can be referred to as a voice frequency and ultrasonic frequency switching pattern AC induction motor. Such a motor is composed of a machine base, a stator and a rotor, said stator including a core of cylinder shape, and stator teeth being disposed on the internal surface of said stator core in equal angles and extending inward along a radial direction with stator grooves penetrating along an axial direction between the teeth; the number of the stator grooves or teeth being determined by the following equation: $Z=2*M*P*Q$, where M being the number of phases of the excitation voltages, P being the number of pairs of stator poles, and Q being the number of grooves or teeth per pole per phase; excitation windings being disposed in the stator grooves, and the rotor of the motor being of a squirrel cage structure; metal conducting bars of the 'squirrel cage' being disposed along the axial direction and distributed at equal intervals in parallel with a cylindrical surface of the rotor; characterized in that: said excitation windings on the stator of the motor being excited by switching AC pulse pattern modulated excitation voltages, and the number K of the metal conducting bars in the rotor 'squirrel cage' being twice of the number P of pairs of the stator poles, i.e. $K=2P$. The excitation windings on the stator are excited by switching AC pulse pattern modulated excitation teelmique, and the excitation voltage is a pulse modulated voltage, which can be referred to as a sine wave pulse modulated excitation voltage, generated after pulse width modulation or pulse amplitude modulation is performed on two phases of continuous sine wave voltages with phase difference of 90° or three phases of continuous sine wave voltages with phase difference of 120°, which can be referred to as modulating sine wave voltages and have equal virtual values and frequencies, together with a pulse square wave voltage within the frequency range of voice or ultrasonic, which can be referred to as a modulating square wave voltage. When Q=1, the structure of the excitation windings on the stator adopts centralized windings with 1/M pole pitch or integral multiple pitch When Q>1, the distributed windings are adopted. The cores of the stator and the rotor are made by soft magnetic material laminations which meet corresponding frequency characteristics within the frequency range of voice and ultrasonic, and subject to surfiicc insulation treatment, then to piling along the axial direction, and it can also be made of ferrite materials with corresponding fiequency characteristic as a whole or in a manner of sectioning along the axial direction.

The most essential innovation of the novel motor according to the present invention is the innovation of the excitation technique, i.e. it is excited by sine wave pulse modulated voltages within the frequency range of voice or ultrasonic, when the excitation windings in the stator are excited, the required pulsating alternating rotating magnetic field is generated in the air gap between the stator and the rotor, induced current is generated in the conducting bars on the rotor, and, the torque of electromagnetic force in such a pulsating alternating rotating magnetic field is applied on the conducting bars, so that the rotor of the motor rotates. Supposing the frequency of the modulating sine wave voltages is F1, the frequency of the modulating square wave voltage is F2, when the motor operates, the rotating speed of the pulsating alternating rotating magnetic field only depends on the frequency F1 of the modulating sine wave voltages, and is independent of the frequency F2 of the modulating square wave voltage, thereby the speed regulation of the motor can be achieved by changing the frequency F1 of the modulating sine wave voltages with a control circuit. Since the pulse frequency of the sine wave pulse modulated excitation voltages, i.e. the pulsating alternating frequency of the rotating field, equals to the frequency F2 of the modulating square wave voltage with its value within the frequency range of voice or ultrasonic, and is much larger than the frequency F1 of the modulating sine wave voltages. It can be derived from the basic principle of the electromagnet theory that, the resistance of the excitation windings of the motor is proportional to frequency F2, and is independent of frequency F1 of the modulating sine wave voltages. The higher F2 is, the smaller the size and mass of the stator core, the rotor core and the windings of the motor are. As long as the frequency F2 is maintained to be relatively fixed, a stable output torque of the motor can be ensured even when the F1 approaches to zero frequency to obtain an extremely low rotating speed, thereby the continuous stepless speed regulation between the rating rotating speed of thousands of circles per minute and zero rotating speed can be achieved under good mechanism characteristic. Since the size of the motor is reduced, materials consumption can be greatly saved, and the stator core and the rotor core can adopt cheaper soft magnetic materials, so the manufacture cost can be greatly reduced.

BRIEF DESCRIPTION OF DRAWINGS

FIGS. 5A, 5B are a view of the pulsating and rotating magnetic field generated by the excitation voltages shown in FIG. 4 and a schematic diagram of the running of the rotor.

DETAILED DESCRIPTIONS OF THE PREFERRED EMBODIMENTS

Figure 1:
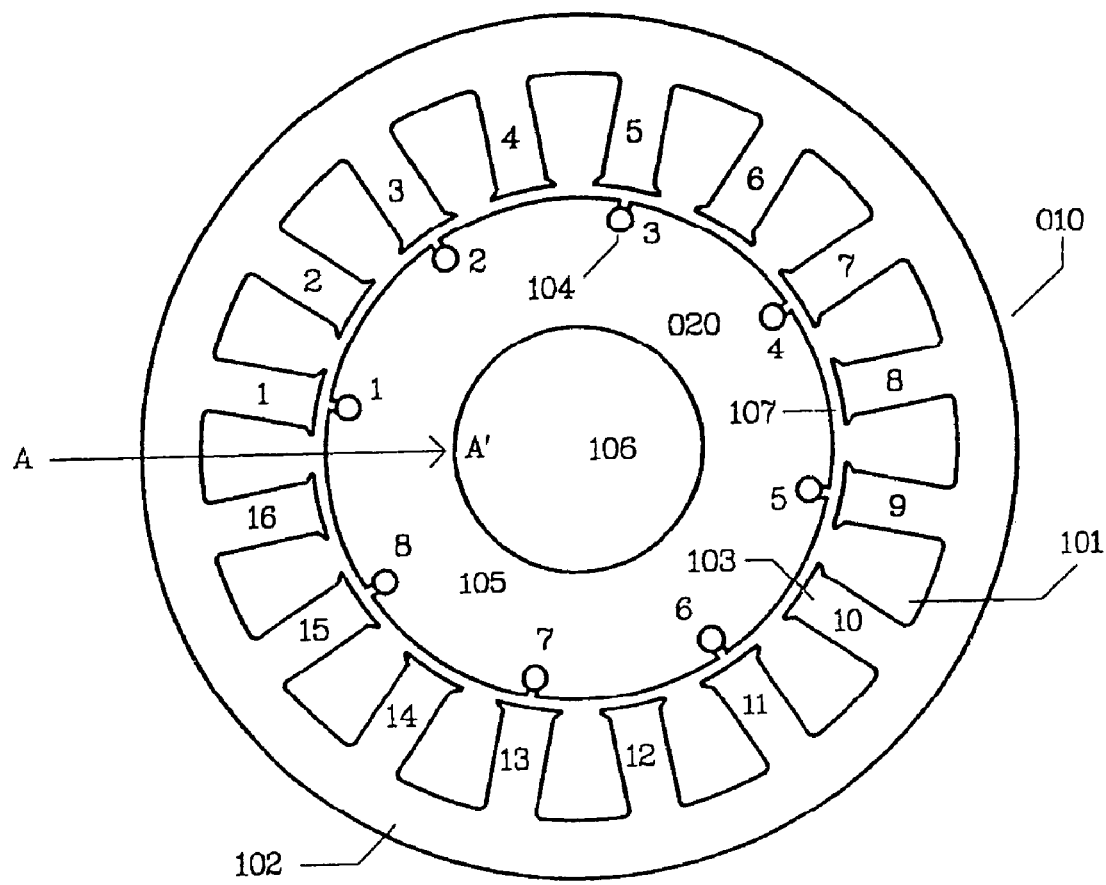
FIG. 1 is a transverse sectional view of the stator and the rotor in a two-phase motor with 16 grooves and 4 pairs of poles.

FIG. 1 shows a transverse sectional view of the stator and the rotor in a two-phase motor with 16 grooves and 4 pairs of poles, wherein "010" is a stator core with a shape of hollow cylinder, "101" are stator grooves penetrating along the axial direction, "102" is a stator yoke, "103" are stator teeth distributed in an identical angle and extending inward along the radial direction, the stator grooves and the stator teeth are arranged alternatively surrounding the internal surface, "020" is a rotor having a cylindrical surface, "104" are conducting bars distributed in parallel with equal intervals along the cylindrical surface of the rotor core of the motor, the conducting bars and the conducting rings (not shown in the drawings) located at the two end-faces of the cylinder are welded to be a metal inductor like a squirrel cage structure, "105" is a rotor core, "106" is a rotor shaft, "107" is the air gap between the rotor and the stator, the rotor shaft is supported by a rotor bearing (not shown in the drawings) on a machine base connected with the stator core as a whole. When the number Z of the stator grooves or teeth is fixed, if the number of the stator grooves or teeth per pole per phase is Q=1, the number of pole-pairs and the number of conducting bars corresponding thereto in the rotor can be increased to obtain a larger output torque. In the embodiment shown in FIG. 1, since the number of phases of the excitation voltages is M=2, and the number of stator grooves [101] or teeth [103] is Z=16, when Q=1, the number of pole-pairs is P=Z/(2*M*Q)=4, there are 8 conducting bars in the rotor, which is twice of the number of pole-pairs.

Figure 4:
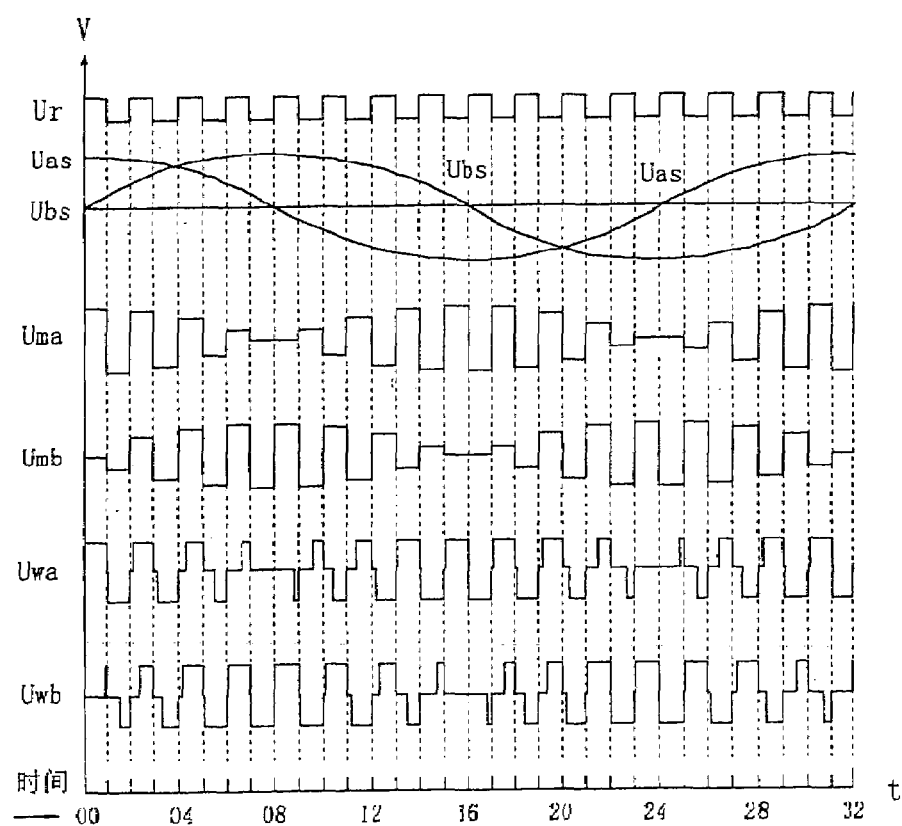
FIG. 4 is a schematic view of the waveforms of the sine wave pulse modulated excitation voltages in the motor shown in FIG. 1.

As described above, the excitation voltages concerned in the present invention are pulse excitation voltages generated by pulse width modulation or amplitude modulation on two phases of modulating sine wave voltages with a phase difference of 90° or three phases of modulating sine wave voltages with a phase difference of 120°, together with a modulating square wave voltage within the frequency range of voice or ultrasonic. The modulating sine wave voltages can be referred to as A phase, B phase and C phase modulating sine wave voltages respectively. For the convenience of explanation, the excitation voltage generated by pulse modulation on the A phase modulating sine wave voltage can be referred to as A phase excitation voltage, the excitation voltage generated by pulse modulation on the B phase modulating sine wave voltage can be referred to as B phase excitation voltage, and so on. As shown in FIG. 4, Ur is a modulating square wave voltage having a waveform of symmetric square wave with a duty factor of 50%. Uas is the A phase modulating sine wave voltage, Ubs is the B phase modulating sine wave voltage, and Uas leads Ubs by 90°. Uwa, Uwb are respectively the A, B phase width modulated excitation voltages, and Uma, Umb are respectively the A, B phase amplitude modulated excitation voltages. As well known, for a pulse width modulated excitation voltage, the pulse amplitude of the excitation voltage is fixed, and the pulse width thereof is proportional to the amplitude value sampled on the modulating sine wave voltage at respective corresponding timings of modulating square wave voltage. In the drawing, the lagging edge of each pulse in the pulse width modulated excitation voltage is fixed at the rising edge or falling edge of the modulating square wave voltage, and its leading edge is variable. For a pulse amplitude modulated excitation voltage, its pulse width is fixed, and the pulse amplitude is proportional to the amplitude value sampled on the modulating sine wave voltage at respective corresponding timings of the modulating square wave voltage. It can be seen from the drawing, the polarity orienting principle of the pulse amplitude of the pulse width modulated or pulse amplitude modulated excitation voltages is: when the directions of the amplitudes of the modulating sine wave voltage and the modulating square wave voltage are the same (i.e. both are positive or both are negative), a positive value is taken, which is a positive pulse; when the directions of the amplitudes of the modulating sine wave voltage and the modulating square wave voltage are the different (i.e. one is positive and the other is negative), a negative value is taken, which is a negative pulse. Further, the pulse amplitudes of the same phase excitation voltage are always alternated positively and negatively along the time axis, except for the zero point of the modulating sine wave voltage.

Figure 2:
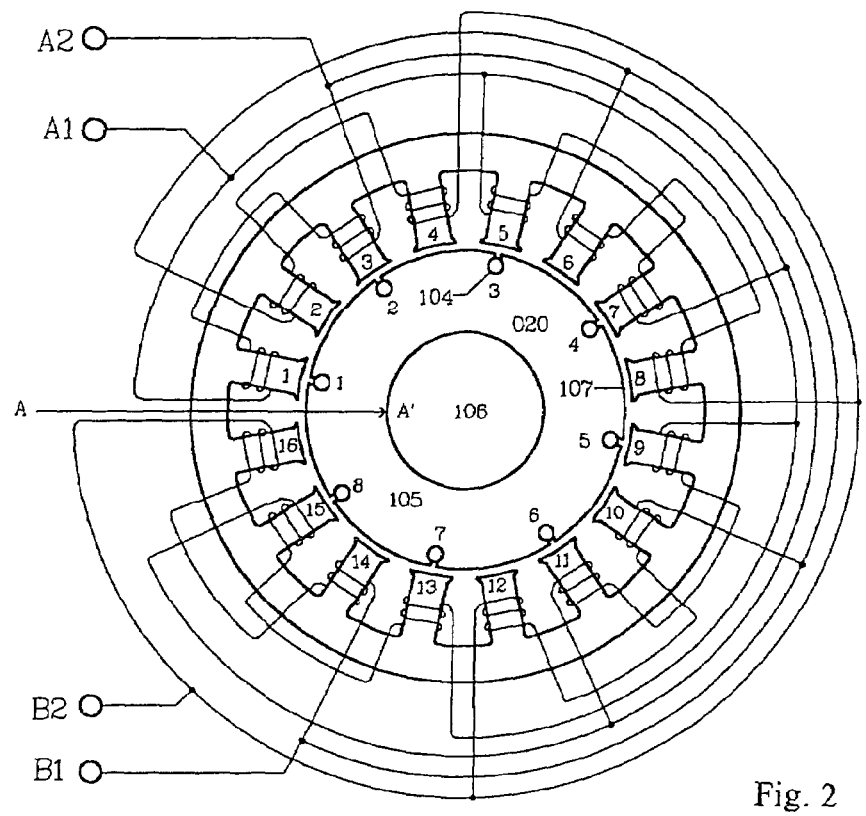
FIG. 2 is a schematic diagram of connection of the ½ pole pitch excitation windings of the motor shown in FIG. 1 and the excitation voltages.
Figure 3:
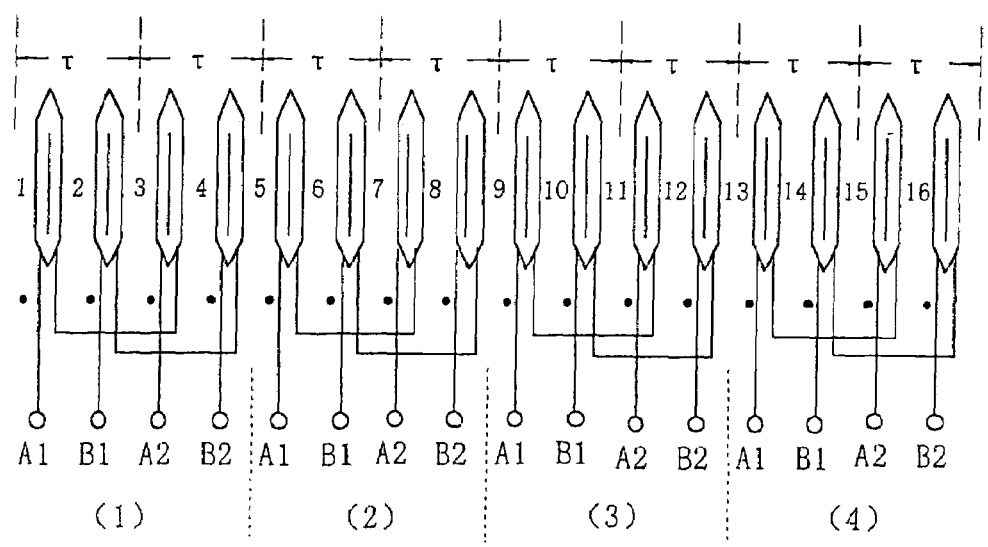
FIG. 3 is a stretch-out view of the ½ pole pitch centralized excitation windings in the motor shown in FIG. 2.

FIG. 2 shows the centralized excitation winding with half pole pitch or ½ pole pitch and the schematic diagram of its being connected with the excitation voltages, the winding has separate excitation windings on each stator tooth, thus it can be referred to as separate type excitation windings. For a centralized excitation winding with ½ pole pitch, it is more convenient to describe with stator teeth. It can be seen from FIG. 2 that, as for 16 stator teeth thereof, in the order of numbers 1~16, every two adjacent teeth constitute one pole, for example, the teeth 1, 2 constitute the first pole, the teeth 3, 4 constitute the second pole, the teeth 5, 6 constitute the third pole, and so on, there are totally 8 poles. Every two adjacent poles are a pair of poles, for example, the first and the second poles constitute the first pair of poles, the third and the fourth poles constitute the second pair of poles, and so on. There are totally 4 pairs of poles. Thus, each pole includes two stator teeth and two stator grooves, thereby includes two separate excitation windings, and are switched in one phase of the two-phases of excitation voltages in a certain phase sequence respectively. As shown in FIG. 2, for the odd teeth in each pole, such as 1, 3, 5, 7 and so on, the excitation windings switch in the A phase excitation voltage; for the even teeth, such as 2, 4, 6, 8 and so on, the excitation windings switch in the B phase excitation voltage. The leading-in terminals of the excitation voltages as shown in the drawing are terminals A1 and A2 respectively for the A phase excitation voltage, and are terminals B1 and B2 respectively for the B phase excitation voltage. Further, it is stipulated that, when the excitation voltage is positive pulse, the terminal "1" of respective phases of excitation voltages, i.e. A1, B1 are the inflow terminals of the excitation current, and are referred to as a head end; the terminal "2" thereof, i.e. A2, B2 are the outflow terminals of the excitation current, and are referred to as a tail end. The manufacturing parameters of all excitation windings are identical, and it is stipulated that, when the excitation voltage is positive direction pulse, if the magnetometive force excited, on the end-face toward the rotor, by the stator teeth winded by the windings is N polarity, the excitation current is always flowing in from the head end of the winding, and flowing out from the tail end of the winding, that is, the current inflow terminal of the winding is referred to as the head end, and the current outflow terminal is referred to as the tail end. Thus, the connection relations between the two excitation windings in each pole and the excitation voltages should be able to ensure that: when the two phases of excitation voltages are both positive pulses, the pole is N polarity; when the two phases of excitation voltages are both negative pulses, the pole is S polarity. The two poles in each pair of poles are antithetic poles of each other, the windings excited by the same phase excitation voltage and the stator teeth winded by them in the antithetic poles are antithetic windings and antithetic stator teeth of each other. The winding direction of the antithetic windings and the connection relations of them with the excitation voltages should be able to ensure that, the polarities of the stator teeth excited by them are opposite to each other, i.e. one is N polarity, and the other is S polarity. Typically, the antithetic windings in the same pair of poles, such as the windings of teeth 1, 3 and the windings of teeth 2, 4 in the first pair of poles, are connected in serial to be an antithetic branch circuit in a manner of head to head or tail to tail. Then, the same numbers of antithetic branch circuits are further connected in serial to be a parallel branch circuit which is connected with the excitation voltages. in parallel, so as to ensure that the resistances in every parallel branch circuit are equal, for example, the number of the parallel branch circuits for every phase excitation voltage shown in FIG. 2 is α=4. FIG. 3 is a stretch-out view of the ½ pole pitch centralized excitation windings corresponding to FIG. 2, in which the terminal with a dot "•" in each excitation winding represents the head end, and the terminal without dot represents the tail end, each antithetic branch circuit acts as a parallel branch circuit. Thus, the number of parallel branch circuits for each phase is α=Z/2*M=4, which are respectively represented by (1), (2), (3), and (4). If the terminals A2, B2 in (1) are respectively connected with the terminals A1, B1 in (2), and the terminals A2, B2 in (3) are respectively connected with the terminals A1, B1 in (4), the number of parallel branch circuits for each phase can be reduced to α=2; if the two parallel branch circuits are connected with each other in serial in the same manner, the number of parallel branch circuits can be reduced to α=1. As known from the basic electromagnet theory, when the excitation winding is switched in the sine wave pulse width modulated or pulse amplitude modulated excitation voltage, after the winding direction of the winding and the connection relations between the winding and the excitation voltage are determined, the direction of the excitation current generated in the winding is determined in accordance with the positive and/or negative polarity of the excitation pulse at each timing, and the amplitude of the current is related to the pulse width or pulse amplitude of the excitation voltage, and a corresponding magnetomotive force is generated across the stator teeth winded by the winding. Obviously, a larger excitation current can be obtained by increasing the number of parallel branch circuits, so as to meet the requirement for larger output power of the motor.

In FIG. 5A, Fm represents the magnetomotive force generated by the pulse modulated excitation voltage, wherein the maximum intensity of the magnetomotive force is roughly indicated by the number of magnetic lines of force, and the polarity of the magnetomotive force is indicated by the arrow of the magnetic lines of force. In the drawing, according to the connection manner between the excitation windings and the excitation voltages, the polarity of the magnetomotive force excited by the positive direction excitation pulse on the corresponding stator tooth is N, the magnetic lines of force direct from the stator tooth to the rotor, and is represented by a downward arrow; the polarity of the magnetomotive force excited by the negative direction excitation pulse is S, the magnetic lines of force direct from the rotor to the stator tooth, and is represented by an upward arrow. Since the excitation voltage is a pulse alternating positively and negatively, the generated magnetic field is a pulsating magnetic field alternating positively and negatively.

Hereinafter, the rotating status of the pulsating magnetic field alternating positively and negatively and the running principle of the motor will be explained with an example of the motor shown in FIG. 1, which is excited by the sine wave pulse modulated excitation voltages shown in FIG. 4, in which the excitation windings and the excitation voltages are connected in the manner shown in FIG. 2 and FIG. 3, with reference to FIGS. 5A and 5B. FIG. 5B comprises two parts on the left and(on the right, in which the column (1) on the left is a sketch view of the amplitudes and phases of the modulating sine wave voltages Uas, Ubs corresponding to FIG. 4, with the horizontal axis representing the amplitude of the modulating sine wave voltage and the vertical axis being the time axis; there are a plurality of sub-diagrams on the right, arranged along the vertical axis in two columns (2) and (3), each sub-diagram has the same structure, and represents a part of the stretch-out view of the cross section of the stator and rotor in the motor shown in FIG. 1 being cut along a line A-A' and further dissected clockwise along the internal surface of the stator, with the section line on the internal surface of the stator as the horizontal axis, and its origin of coordinate being located at the intersection point of the line A–A' and the internal surface of the stator, so as to show, corresponding to several specific timings shown in FIG. 4, the correspondence relations of the magnetomotive force generated by the excitation windings and the running status of the rotor versus the amplitude values of the modulating sine wave voltages sampled at the timings. Supposing, for the sampled value at each specific time, there are positive and negative excitation pulses temporally close to each other to correspond to it, and in the drawing, column (2) corresponds to positive direction pulses, and column (3) corresponds to negative direction pulses. The temporal relation between the two parts on the left and on the right in the drawing is indicated by dot lines.

Refer to FIG. 2 and FIG. 3, as described above, the excitation windings of the odd teeth and the even teeth in each stator pole are respectively excited by the A phase and B phase excitation voltages, for example, teeth 1, 3, 5, 7 etc. are excited by the A phase width modulated excitation voltage Uwa (or amplitude modulated excitation voltage Uma), teeth 2, 4, 6, 8 etc. are excited by the B phase width modulated excitation voltage Uwb (or amplitude modulated excitation voltage Umb). The letters A, B on the stator yoke are used to represent the excitation phase sequence for the corresponding stator teeth, the numbers drawn in box "□" are used to represent the serial number of the stator teeth, the magnetic lines of force drawn on the section of the stator teeth are used to represent the strength and direction of the magnetomotive force generated on the stator teeth at respective timings. Since the frequency F2 of the modulating square wave voltage is much larger than the frequency F1 of the modulating sine wave voltages Uas, Ubs, it can be regarded that the positive and negative excitation pulses temporally close to each other in the excitation voltages respectively have similar width (or amplitude), and the strength of the magnetomotive force generated in the corresponding stator teeth should also be approximately identical, with the directions being opposite.

Referring to column (1) and the first row of columns (2), (3) in FIG. 4 and FIG. 5B, at the timing of t=00, since the A phase modulating sine voltage Uas has a maximal value, the positive and negative pulses of the A phase excitation voltage Uwa corresponding to the timing have maximal pulse width value as well (the positive and negative pulses of Uwa have maximal amplitude value as well); since the B phase modulated sine wave voltage Ubs is 0, the pulse width of the B phase excitation voltage Uwb (or the amplitude of Uma) corresponding to this timing is 0 for both positive direction and negative direction. Therefore, the teeth number 1 and number 3 excited by the A phase excitation voltage have the maximal strength of magnetomotive force, which are represented by four magnetic lines of force respectively. When the excitation voltage is a positive pulse, the magnetomotive force generated at the tooth number 1 is N polarity, and the arrow of the magnetic line of force directs to the rotor, the magnetomotive force generated at the tooth number 3 is S polarity, and the arrow of the magnetic line of force directs to the stator yoke. The strength of the magnetomotive force generated at teeth number 2 and 4 excited by the B phase excitation voltage is 0, so the number of its magnetic line of force is 0 as well. Supposing the position of the rotor of the motor is just in the state as shown in the drawing, that is to say, the conducting bars with serial number X1 and X2 on the rotor core are facing against exactly the middle of the stator teeth number 1, 3, then the close galvanic circuit formed by the conducting bars X1 and X2 together with the parts between the welding points on the conducting rings of the two end-faces of the rotor can be referred to as a X1-X2 induction circuit, which exactly faces against the stator segment centered on the middle of the tooth number 2. Thus, as shown in the cells in column (2), in the X1-X2 induction circuit, the magnetic flux flowed from the stator tooth number 1 into the rotor through the air gap is exactly equal to the magnetic flux flowed from the rotor core into the stator tooth number 3 through the air gap. Similarly, as shown in column (3), in the X1-X2 induction circuit, the magnetic flux flowed from the stator tooth number 3 into the rotor core through the air gap is exactly equal to the magnetic flux flowed from the rotor core into the stator tooth number I through the air gap. Thus, the variance ratio of the magnetic flux flowing in the X1-X2 induction circuit at the moment versus time is 0, so no induced current is generated in the close induction circuit, and no electromagnetic force is applied on the conducting bars X1 and X2. As described above, because of the uniformity and symmetry of the structures of the rotor and stator in the motor, all of the other close induction circuits in the rotor are in the same status. Since all conducting bars in the rotor are not subject to any torque of electromagnetic force, the rotor does not rotate.

However, during a period of changing from t=00 to t=04 via t=02, the thing is different. In the cells in columns (2) and (3) of the second row in FIG. 5B, the strength and direction of the magnetomotive force generated by the positive and negative excitation pulses corresponding to the timing t=02 in column (1) are shown. It can be seen that the amplitude of the A phase modulating sine wave voltage Uas is decreased at t=02 as compared with that at t=00, the pulse width of the excitation voltage Uwb (or the amplitude of Uma) corresponding to this is also decreased accordingly. Therefore, the magnetic lines of force representing the strength of the magnetomotive force of tooth number 1 and tooth number 3 in the cells of column (2) is decreased from 4 to 3, in which tooth number 1 has arrows directing to the rotor and is N polarity, tooth number 3 has arrows directing to the stator yoke and is S polarity. The amplitude of the B phase modulating sine wave voltage Ubs is increased at t=02 as compared with that at t=00, the pulse width of the excitation voltage Uwb (or the amplitude of Uma) corresponding to this is also increased accordingly. Therefore, the magnetic lines of force representing the strength of the magnetomotive force of tooth number 2 and tooth number 4 in the cells of column (2) is increased from 0 to 1, in which tooth number 2 has arrow directing to the rotor and is N polarity, tooth number 4 has arrow directing to the stator yoke and is S polarity. If the rotor of the motor and the X1-X2 close induction circuit thereof are still at the position of t=00, since the excited magnetomotive force or magnetic field on the respective stator teeth corresponding to it are changed, in the close induction circuit X1-X2, the magnetic flux flowing from stator teeth number 1, 2 into the rotor core through the air gap is larger than the magnetic flux flowing from the rotor core into stator tooth number 3 through the air gap. Therefore, it can be known from the theory of electromagnetic induction that an induced current as shown in the drawing is generated in the X1-X2 close circuit, and its direction is as follows: the current in the conducting bar X1 facing against stator tooth number 1 flows outward, and the current in the conducting bar X2 facing against stator tooth number 3 flows inward. Thus, both of the two conducting bars X1 and X2 are subject to an electromagnetic force rightward, i.e. clockwise in relation to the stator poles. Because of the uniformity and symmetry of the structures of the stator and rotor in the motor, the conducting bars in all of the other close inducting circuits in the rotor are subject to the same electromagnetic force, thus the rotor will rotate clockwise until a balance point of the torque is reached. At almost the same time, in the cells shown in column (3), supposing the width (or amplitude) of its excitation pulse is scarcely changed, with only the direction being reversed, i.e. changed from a positive pulse to a negative pulse, the number of the magnetic lines of force representing the strength of the magnetomotive force is not changed, but the direction of the magnetic lines of force are reversed as compared with those of column (2). If the rotor and its X1-X2 close induction circuit has reached a balance point of the torque when the excitation voltage is a positive pulse, obviously, there is no induced current in the close induced circuit, and the rotor does not rotate; if the X1-X2 close induction circuit has not reached a balance point of the torque when the excitation voltage is a positive pulse, an induced current opposite in direction with respect to column (2) is generated in the X1-X2 close induction circuit. However, since the magnetomotive force or magnetic field corresponding to the conducting bars X1, X2 is also reversed, the electromagnetic force causes the circuit to move in the original direction, until a balance point is reached. The situation when time goes to t=04 is shown in cells of column (2) and column (3) of the third row in FIG. 5B. According to the same theory, the rotor also rotates clockwise with respect to the stator, until a new balance point of the torque is reached. So long as the excitation phase sequence is not changed, such an alternating pulsating rotating magnetic field, as well as the direction of the torque of electromagnetic force generated in respective conducting bars of the rotor, will not change.

It can be seen from FIG. 5B that, when the time changes from t=00 to t=08 in the drawing, the modulating sine wave voltages in the excitation voltages pass ¼ period, the conducting bars X1, X2 rotate along with the rotor of the motor from the position facing respectively against the stator teeth number 1, 3 to the position facing respectively against the stator teeth number 2, 4, the number of teeth or grooves rotated by is 1. It can be concluded that, when the modulating sine wave voltages pass ½ period, the number of the teeth or grooves that the rotor of the motor rotates by is 2, i.e. a spatial angle of one pole pitch (shown as r in the drawing). When the modulating sine wave voltages pass 1 period, the rotor, of the motor rotates by exactly a spatial angle of one pair of poles, i.e. the rotor rotates by 1/P circle. Hence, the rotating speed per minute of such a motor .can be approximately calculated as: n=60*F1/P, which is the same as the above mentioned rotating speed formula of the conventional induction motor. However, for the motor, since the frequency F1 of its modulating sine wave voltages can approach to value of "0" without limit, its rotating speed can approach to zero without limit. It can be seen that the rotation of the rotor can be reversed by changing any phase of the two phases of excitation voltages into an excitation voltage reversed from the original excitation voltage (the reversed excitation voltage can be regarded as an excitation voltage generated by modulating the modulating sine wave voltage of this phase and the negative modulating square wave voltage).

Figure 6A:
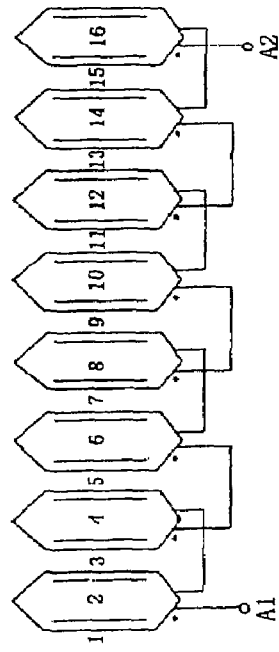
FIGS. 6A~8B are stretch-out views of several kinds of integral multiple pitch excitation windings in the motor shown in FIG. 1.
Figure 6B:
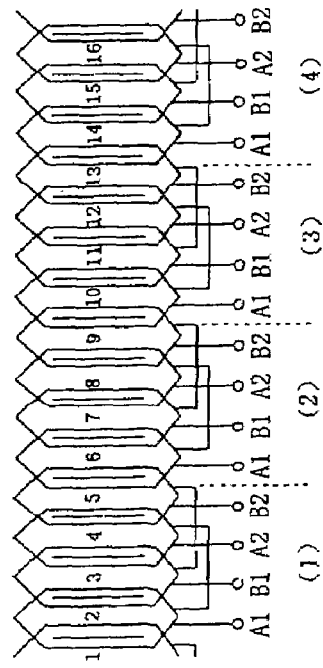
Figure 7A:
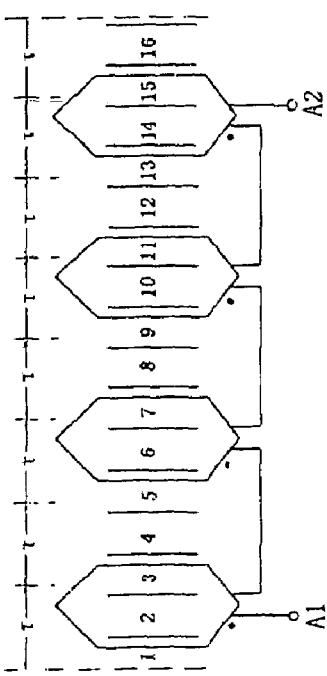
Figure 7B:
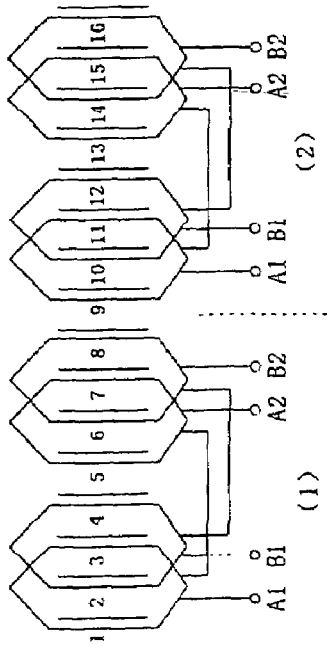

Similar to the conventional induction motor, the manner constituting the excitation windings of the present motor is not only like this one. FIGS. 6A–8B show the structures of several kinds of integral multiple pitch excitation windings in the motor shown in FIG. 1 with Q=1, wherein FIG. 6A shows a schematic view of A phase integral multiple pitch and single layer windings connected to be a parallel branch circuit, and the excitation windings in the branch circuit are connected in serial with head to tail or tail to head. FIG. 6B is a schematic diagram of connection of the A, B phases of integral multiple pitch and single layer windings, wherein the number of the parallel branch circuits is α=2, which are represented by (1) and (2) respectively. If the terminals A2, B2 in (1) are respectively connected with the terminals A1, B1 in (2), the number of the parallel branch circuits of each phase can be reduced to α=1. The windings have simple structures with each stator groove having only one coil side, which is adaptive for a motor with lower power. FIG. 7A is a schematic diagram of connection of the integral multiple pitch windings in chain excited by the A phase excitation voltage, wherein each excitation winding is connected in serial with head to head or tail to tail, and constitutes a parallel branch circuit, i.e. α=1. FIG. 7B is a schematic diagram of connection of the integral multiple pitch windings in chain excited by both of A and B phases of excitation voltages, with each stator groove having two coil sides. In the drawing, the number of parallel branch circuits of each phase is α=4, which are represented by (1), (2), (3), (4) respectively. If the terminals A2, B2 in (1) are respectively connected with the terminals A1, B1 in (2), and the terminals A2, B2 in (3) are respectively connected with the terminals A1, B1 in (4), the number of the parallel branch circuits of each phase can be reduced to α=2. In the same manner, the number of the parallel branch circuits of each phase can be reduced to α=1.

Figure 8A:
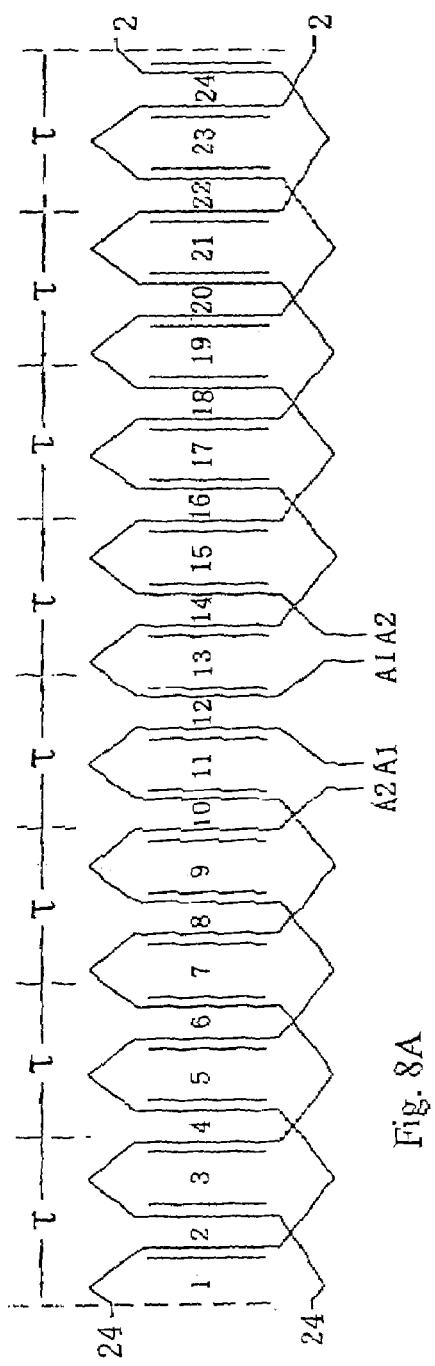
Figure 8B:
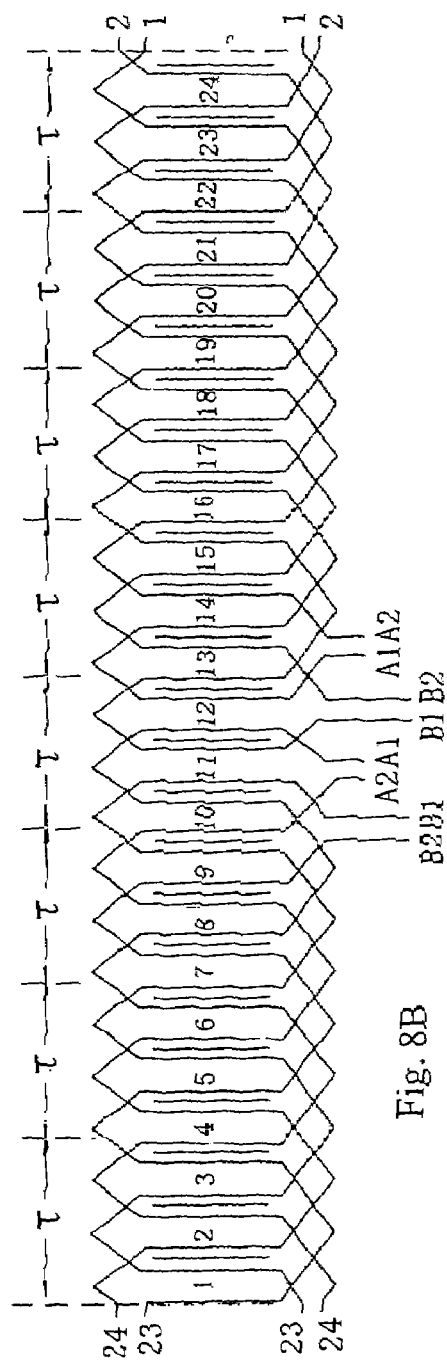

FIG. 8A shows a schematic diagram of connection of the integral multiple pitch wave windings excited by the A phase excitation voltage, in which the number of the parallel branch circuits is α=2. FIG. 8B shows a schematic diagram of connection of the integral multiple pitch wave windings excited by both of A and B phases of excitation voltages, in which the number of the parallel branch circuits of each phase is still α=2, if the excitation windings in phase are connected in serial in the direction of the current, the number of the parallel branch circuits of each phase can be reduced to α=1.

Since the magnetic field excited by these integral multiple pitch excitation windings are substantially the same as that excited by ½ pole pitch windings, the previous analysis to the operational principle of the ½ pole pitch windings is also applicable. The present invention does not exclude excitation windings in other manner having equivalent functions as the excitation windings listed above.

Figure 9:
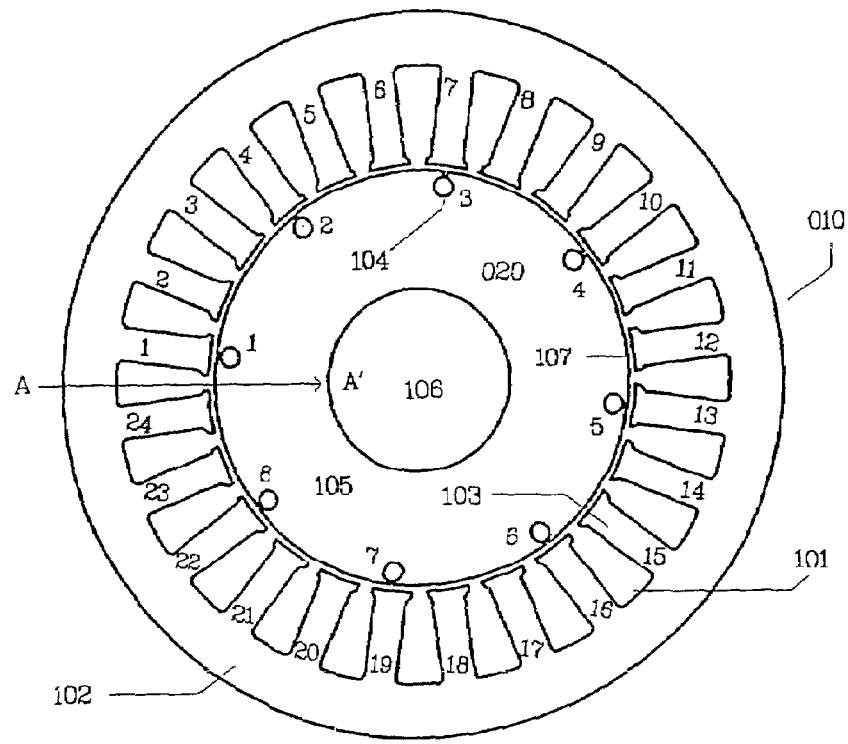
FIG. 9 is a transverse sectional view of the stator and the rotor in a three-phase motor with 24 grooves and 4 pairs of poles.

FIG. 9 shows a transverse sectional view of the stator and the rotor in a three-phase switching induction motor with 24 grooves and 4 pairs of poles. In the drawing, "010" is a stator core, "101" are stator grooves, "102" is a stator yoke, "103" are stator teeth, "020" is a rotor having a cylindrical surface, "104" are conducting bars, and the conducting bars and the conducting rings (not shown in the drawings) located at the two end-faces of the cylinder are welded to be a metal inductor like a squirrel cage structure. "105" is a rotor core, "106" is a rotor shaft, "107" is the air gap between the rotor and the stator, and the rotor shaft is supported by a rotor bearing (not shown) on a machine base connected with the stator core as a whole. It can be seen from the drawing that, supposing Q=1, the number of phases of the excitation voltages in the motor is M=3, and the number of stator grooves [101] or teeth [103] is Z=24, the number of pole-pairs is P=Z/(2*M*Q)=4, and there are eight conducting bars in the rotor, which is twice of the number of pole-pairs.

The 24 stator teeth in FIG. 9 are grouped in the order of number 1~24, every three adjacent teeth constitute one pole, for example, the teeth 1, 2, 3 constitute the first pole, the teeth 4, 5, 6 constitute the second pole, the teeth 7, 8, 9 constitute the third pole, and so on, there are totally eight poles. Every two adjacent poles are a pair of poles, for example, the first and the second poles constitute the first pair of poles, and the three and the fourth poles constitute the second pair of poles, and so on, there are totally four pairs of poles. Since each pole includes three stator teeth, three stator grooves and three separate windings, they are divided into three groups according to he spatial relative position in each pole. For example, the excitation windings on teeth 1, 4, 7, 10, 13, 16, 19 and 22 are the first group, the excitation windings on teeth 2, 5, 8, 11, 14, 17, 20 and 23 are the second group, and the excitation windings on teeth 3, 6, 9, 12, 15, 18, 21 and 24 are the third group, which switch into one phase of the three phases of excitation voltages respectively.

Figure 11:
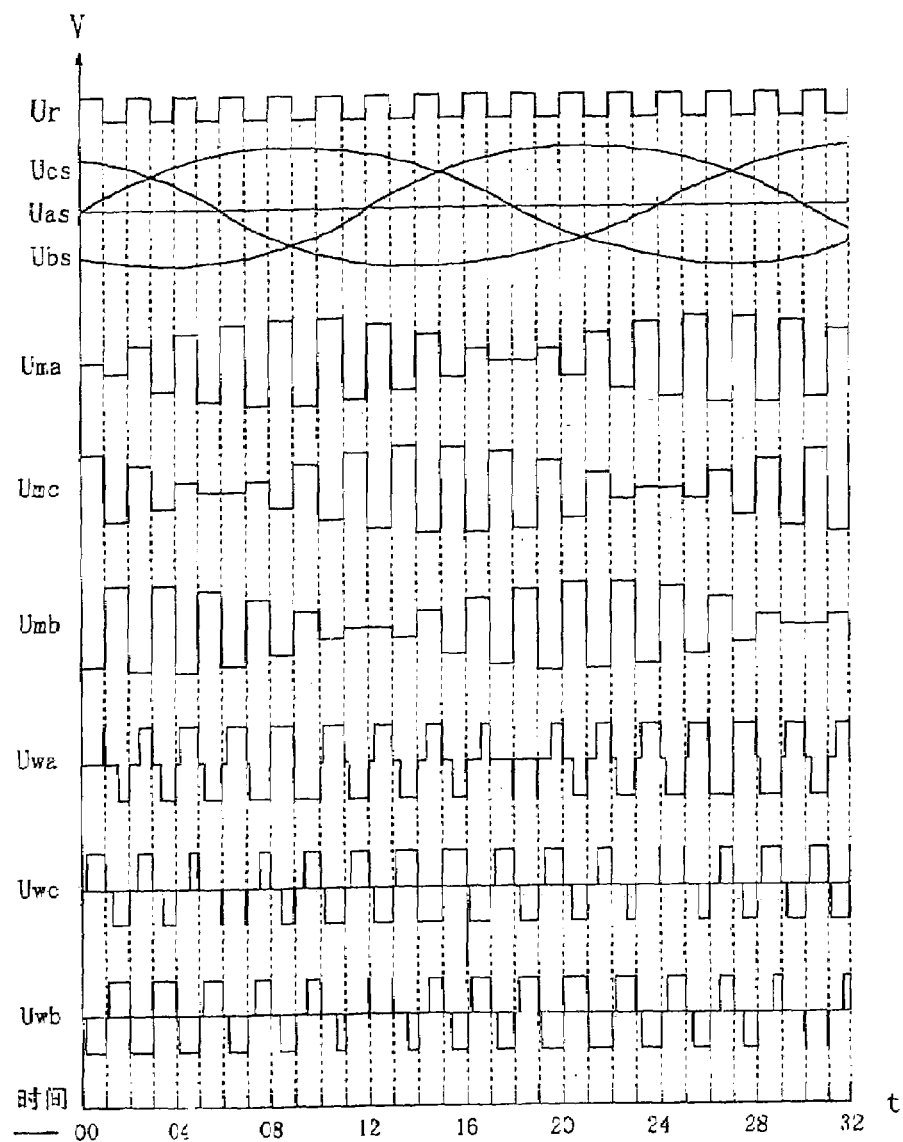
FIG. 11 is a schematic view of the waveforms of the sine wave pulse modulated excitation voltages in the motor shown in FIG. 9.

FIG. 11 is a schematic view of the waveforms of the three phases of pulse excitation voltages in the motor shown in FIG. 9. In the drawing, Ur is the modulating square wave voltage, Uas, Ubs and Ucs are three phases of modulating sine wave voltages A, B, C, wherein Uas leads Ubs by an angle of 120°, Ubs leads Ucs by an angle of 120°, and Ucs leads Uas by an angle of 120°. It can be seen from the drawing that, the polarity orienting principle of the pulse amplitude of the pulse width modulated (or amplitude) modulated excitation voltages is still as described above, that is to say, a positive value is taken when the directions of the amplitudes of the modulating sine wave voltages and the modulating square wave voltage are the same, and a negative value is taken when the directions are different. Further, the pulse amplitudes of the same phase excitation voltage are always alternated in the positive and negative directions along the time axis, except for the zero point of the modulating sine wave voltage.

Figure 10:
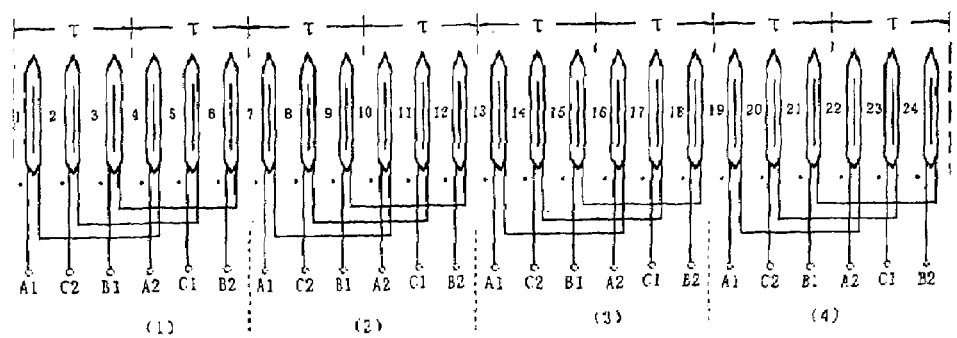
FIG. 10 is a stretch-out view of the ⅓ pole pitch centralized excitation windings in the motor shown in FIG. 9.

FIG. 10 is a stretch-out view of the ⅓ pole pitch centralized excitation windings in the motor shown in FIG. 9, the definitions and reference signs of the leading-in terminal for the excitation voltages, the head ends and the tail ends of the excitation windings are the same as mentioned above. In the drawing, the A phase excitation voltage Uwa (or Uma) is switched into the excitation windings in the respective teeth in the first group mentioned above, the C phase excitation voltage Uwc (or Umc) is switched into the excitation windings in the respective teeth in the second group mentioned above, and the B phase excitation voltage Uwb (or Umb) is switched into the excitation windings in the respective teeth in the third group mentioned above. Such a phase sequence makes the motor shown in FIG. 9 rotate clockwise, thus it can be referred to as clockwise excitation phase sequence. If the phase sequences of any two phases of excitation voltages are exchanged, for example, the three phases of pulse modulated excitation voltages shown in FIG. 11 are respectively switched into the excitation windings in the respective teeth in the first, second, and third group mentioned above in a phase sequence of Uwa (or Uma), Uwb (or Umb), and Uwc (or Umc), the motor shown in FIG. 9 will rotate anticlockwise, thus it can be referred to as anticlockwise excitation phase sequence. In the drawing, all antithetic windings are connected in serial to be an antithetic branch circuit in a manner of head to head or tail to tail, and each antithetic branch circuit acts as a parallel branch circuit. Thus, the number of parallel branch circuits of each phase is α=Z/2*M=4, which are represented by (1), (2), (3), (4) respectively. If the terminals A2, C1, B2 in (1) are respectively connected with terminals A1, C2, B1 in (2), and the terminals A2, C1, B2 in (3) are respectively connected with terminals A1, C2, B1 in (4), the number of the parallel branch circuits of each phase can be reduced to α=2. If the two parallel branch circuits are further connected in serial in the same manner, the number of parallel branch circuits of each phase can be reduced to α=1.

Figure 12:
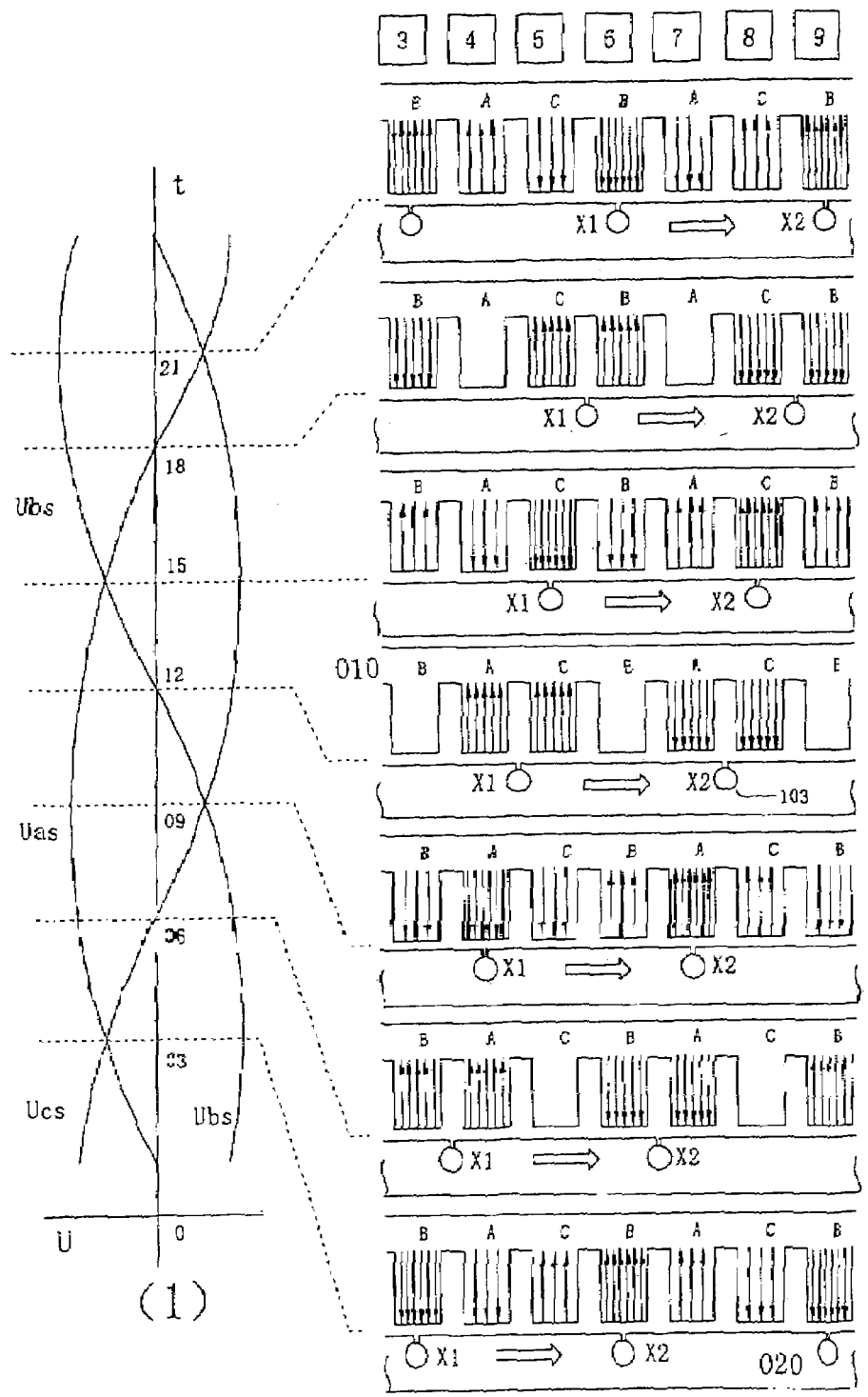
FIGS. 12, 13 are views of the pulsating and rotating magnetic field generated by the excitation voltages shown in FIG. 11 and schematic diagrams of the running of the rotor.

FIG. 12 schematically shows the pulsating rotating magnetic field generated when it is excited by the excitation voltages shown in FIG. 11 in the above mentioned clockwise excitation phase sequence, as well as the running of the motor. FIG. 12 also comprises two parts on the left and on the right, in which the column (1) on the left is a schematic view of the amplitudes and phases of the A, B, C phases of the modulating sine wave voltages Uas, Ubs, Ucs shown in FIG. 12, with the horizontal axis representing the amplitudes of the modulating sine wave voltages, and the vertical axis being the time axis; there are a plurality of sub-diagrams on the right part column (2), arranged along the vertical axis in one column. Each sub-diagram has the same structure, and represents a part of the stretch-out view of the cross section of the stator and rotor in the motor shown in FIG. 9 being cut along line A–A' and further dissected clockwise along the internal surface of the stator, with the section line on the internal surface of the stator as the horizontal axis, and its origin of coordinate being located at the intersection point of the line A–A' and the internal surface of the stator, so as to schematically show, at several specific timings shown in FIG. 11, the correspondence relation of the magnetomotive force generated at the stator teeth and the running status of the rotor versus the sampled amplitude values of the modulating sine wave voltages at the timings. In order to simplify the analysis, supposing, for the sampled values at each specific time, there is only one positive or negative excitation pulse to correspond to it, which appears alternatively in a time sequence as sampled. The temporal relation between the two parts on the left and the right in the drawing is indicated by dot lines, and the definitions of the reference signs and expressions in the drawing is the same as those used above. It can be seen from the drawing that, at time t=03, the conducting bars X1, X2 are respectively located at the positions facing against the stator teeth number 3 and number 6; at t=21, the excitation voltages pass exactly ½ period, and the conducting bars X1, X2 are rotated together with the rotor to the positions respectively facing against the stator teeth number 6 and number 9, i.e. a spatial angle of one pole pitch (shown as r in the drawing) is rotated by.

Figure 13:
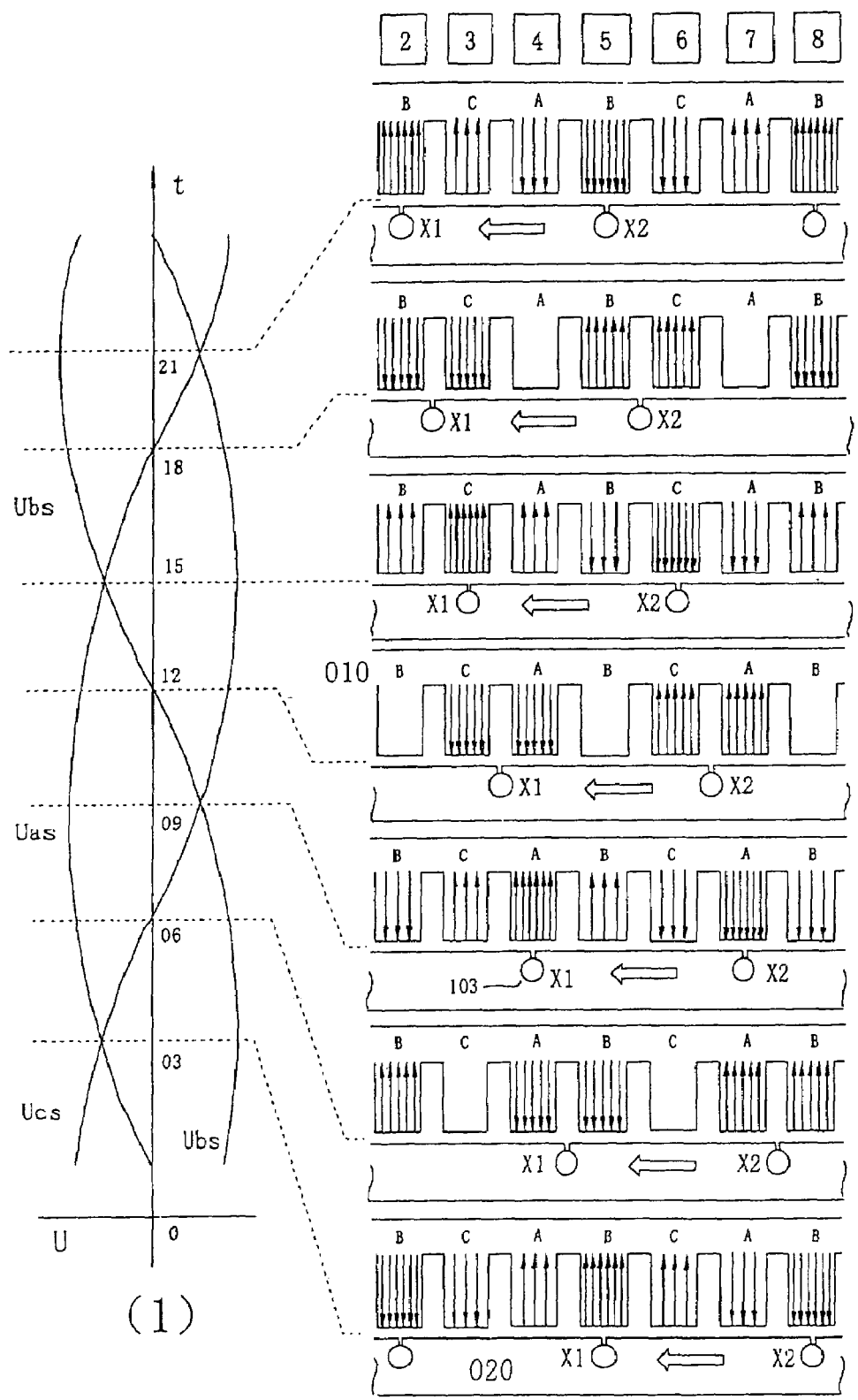

When the modulating sine wave voltages pass 1 period, the rotor of the motor rotates by exactly a spatial angle of one pair of poles, i.e. the rotor rotates 1/P circle. Thus, for the three-phase motor shown in FIG. 9, the formula for the rotating speed is the same as that of the above mentioned two-phase motor. FIG. 13 schematically shows the pulsating rotating magnetic field generated when it is excited by the excitation voltages shown in FIG. 11 in the above mentioned anticlockwise excitation phase sequence, as well as the running of the motor. It can be seen from the drawing that, since the phase sequence of the excitation voltages is changed, the motor rotates reversely.

Figure 14A:
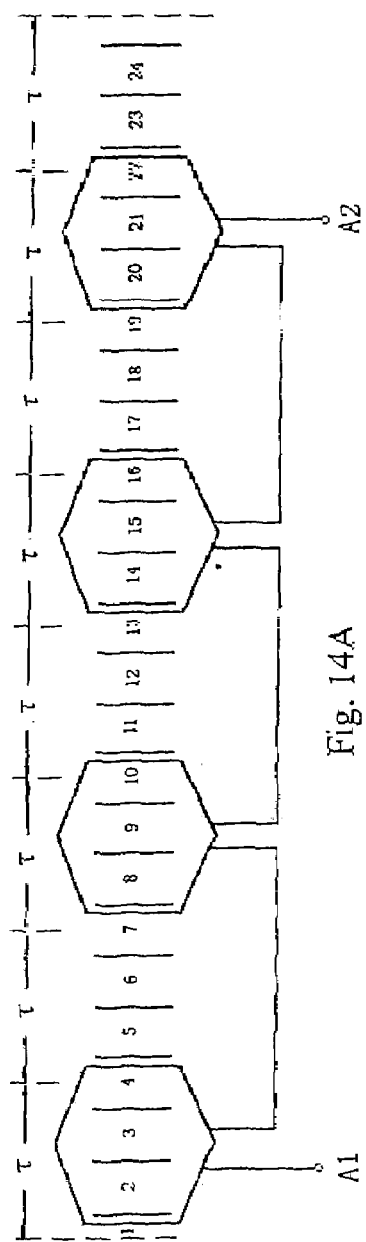
FIGS. 14A~16B are stretch-out views of several kinds of centralized excitation windings in the motor shown in FIG. 9.
Figure 14B:
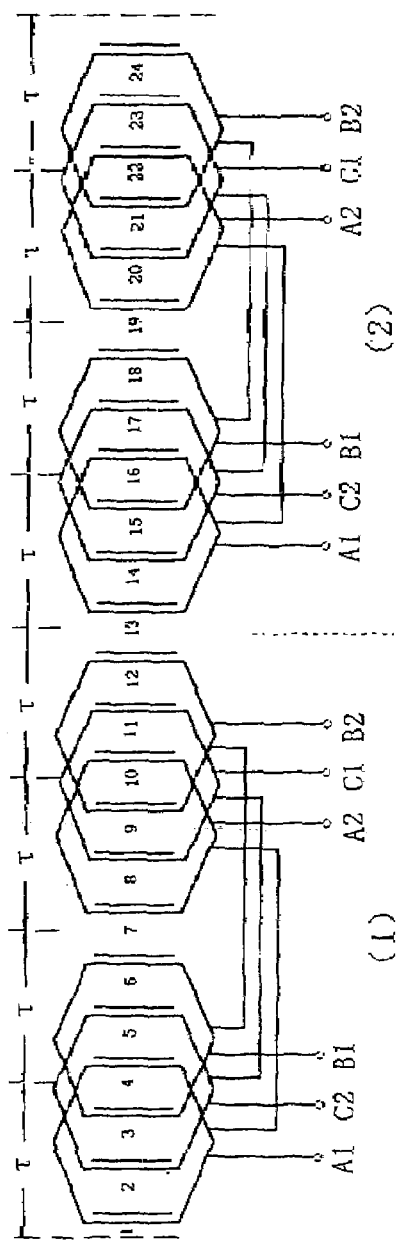
Figure 15A:
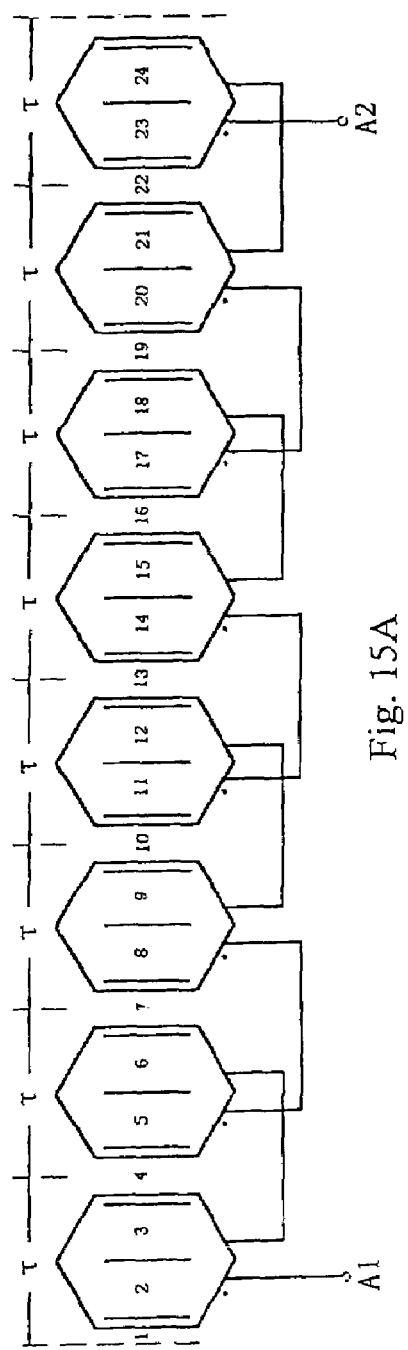
Figure 15B:
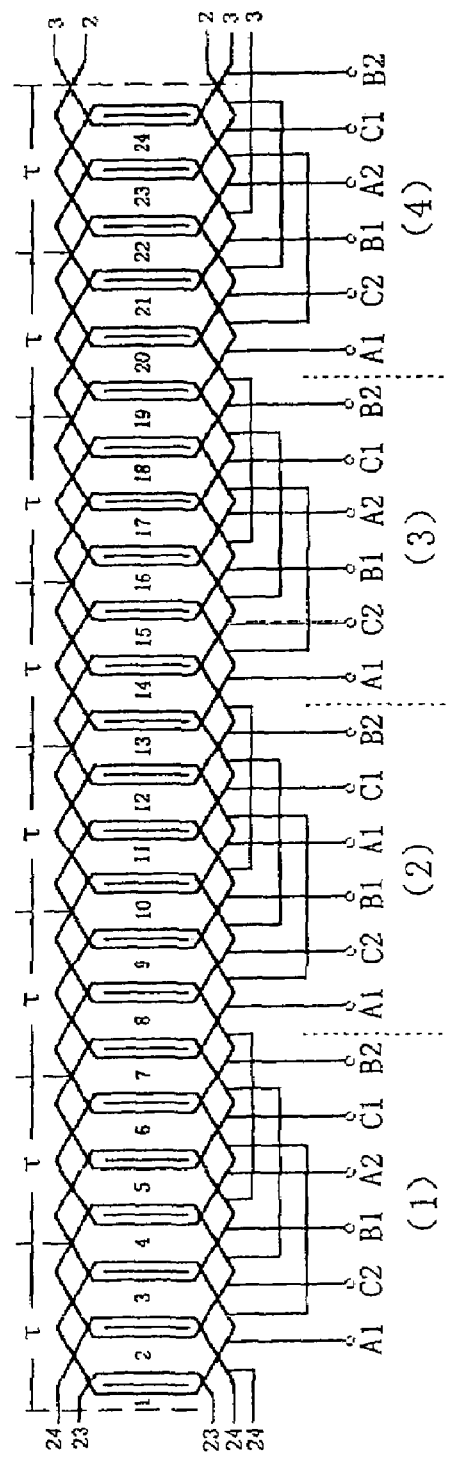
Figure 16A:
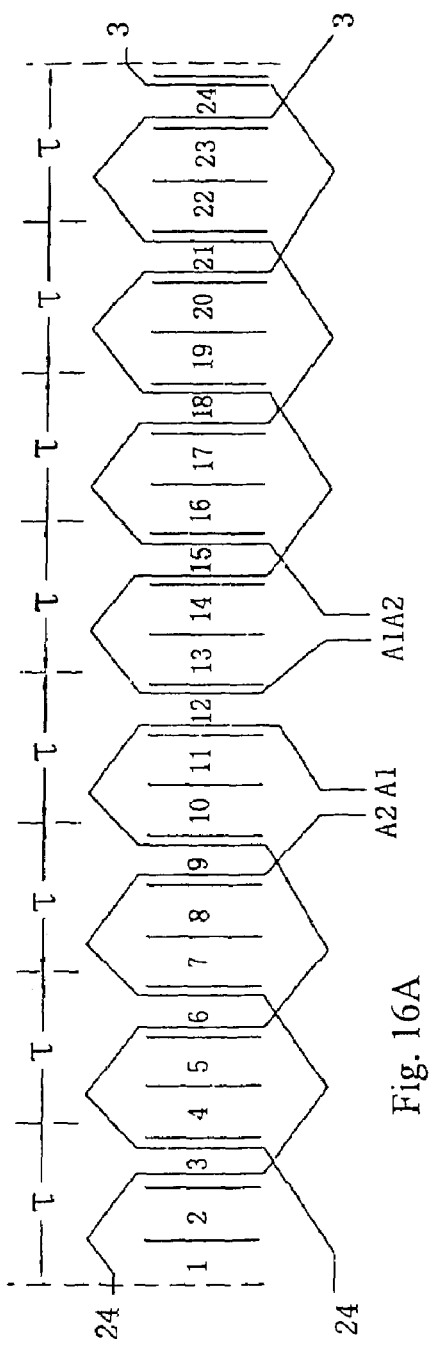
Figure 16B:
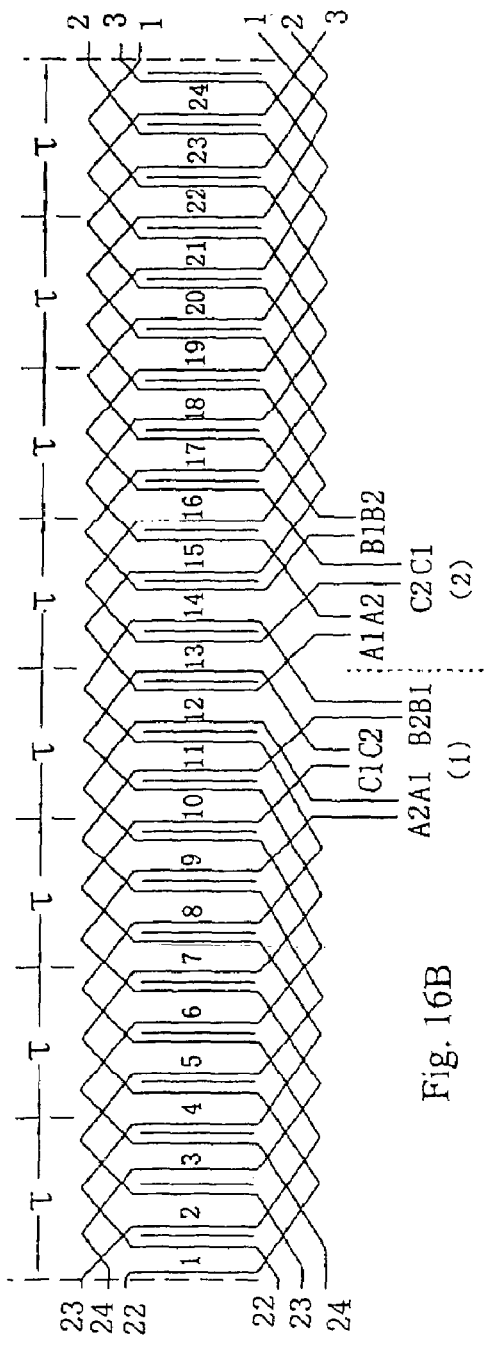

FIGS. 14A–16B show the structures of several kinds of integral multiple pitch excitation windings in the motor shown in FIG. 9 with Q=1, wherein FIG. 14A shows a schematic diagram of A phase integral multiple pitch and single layer windings connected to be one parallel branch circuit, and the excitation windings in the branch circuit are connected in serial in a manner of head to tail or tail to head. FIG. 14B is a schematic diagram of connection of the A, B, C phases of integral multiple pitch and single layer windings, wherein the number of the parallel branch circuits is α=2, which are represented by (1) and (2) respectively. If the terminals A2, C1, B2 in (1) are respectively connected with the terminals A1, C2, B1 in (2), the number of the parallel branch circuits of each phase can be reduced to α=1. The windings have simple structure with each stator groove having only one coil side, which is adaptive for a motor with lower power. FIG. 15A is a schematic diagram of connection of the integral multiple pitch windings in chain excited by the A phase excitation voltage, wherein each excitation winding is connected in serial in a manner of head to head or tail to tail, and constitutes one parallel branch circuit, i.e. α=1. FIG. 15B is a schematic diagram of connection of the integral multiple pitch windings in chain excited by three phases of excitation voltages A, B, C, with each stator groove having two coil sides. In the drawing, the number of parallel branch circuits of each phase is α=4, which are represented by (1), (2), (3), (4) respectively. If the terminals A2, C1, B2 in (1) are respectively connected with the terminals A1, C2, B1 in (2), and the terminals A2, C1, B2 in (3) are respectively connected with the terminals A1, C2, B1 in (4), the number of the parallel branch circuits of each phase can be reduced to α=2. In the same manner, the number of the parallel branch circuits of each phase can be reduced to α=1. FIG. 16A is a schematic diagram of connection of the integral multiple pitch wave windings excited by the A phase excitation voltage, the number of parallel branch circuits in the drawing is α=2. FIG. 16B is a schematic diagram of connection of the integral multiple pitch wave windings excited by three phases of excitation voltages A, B, C, the number of parallel branch circuits of each phase in the drawing is still 2, if the excitation windings in phase are connected in serial in the direction of the current, the number of the parallel branch circuits of each phase can be reduced to α=1.

Figure 17:
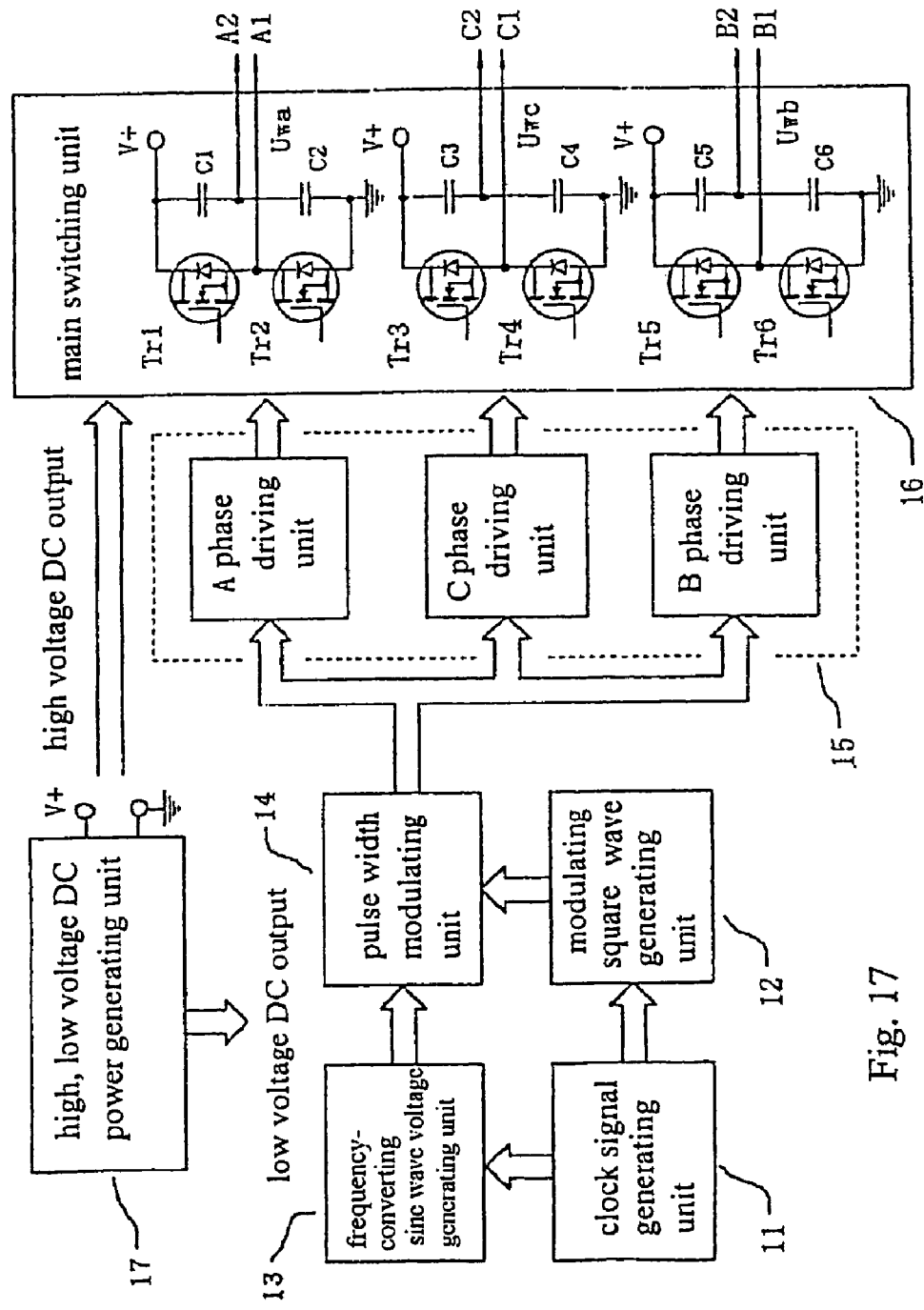
FIGS. 17, 18 are block diagrams of the excitation control circuits of the motor shown in FIG. 9.

FIG. 17 is a block diagram of the pulse width modulated excitation control circuit of the motor with 24 grooves and 4 pairs of poles as shown in FIG. 9. In the drawing, the synchronous control pulse output by the clock signal generating unit [11] is transmitted to the modulating square wave generating unit [12] and frequency-converting sine wave voltage generating unit [13] respectively. After subjecting to micro-power pulse width modulation in pulse width modulating unit [14], the frequency convertible three phases of modulating sine wave voltages Uas, Ubs, Ucs with a 120° phase difference with respect to one another which are output by the frequency-converting sine wave voltage generating unit, and the modulating square wave voltage Ur output by the modulating square wave generating unit, are used to drive the power switching devices in the main switching unit [16] via A, C, B three phase driving unit [15]. The main switching unit has three groups of DC half-bridge switching circuit made up of 6 power field effect switching transistors and 6 capacitors. Under the control of the driving circuit, two switching transistors in each DC half-bridge switching circuit turn on and off alternatively, so that three phases of pulse width modulated excitation voltages are output from A1, A2; C1, C2; B1, B2 respectively, so as to excite the stator windings. The power devices contained in this circuit is fewer, the circuit of the control part can be analogous or digital, and can be integrated to dedicated circuits, and can be deployed within the motor together with the power device, so as to further reduce its total size. High and low voltage DC power generating unit [17] outputs DC high voltage required by the main switching circuit and DC low voltage required by the integrate circuit.

Figure 18:
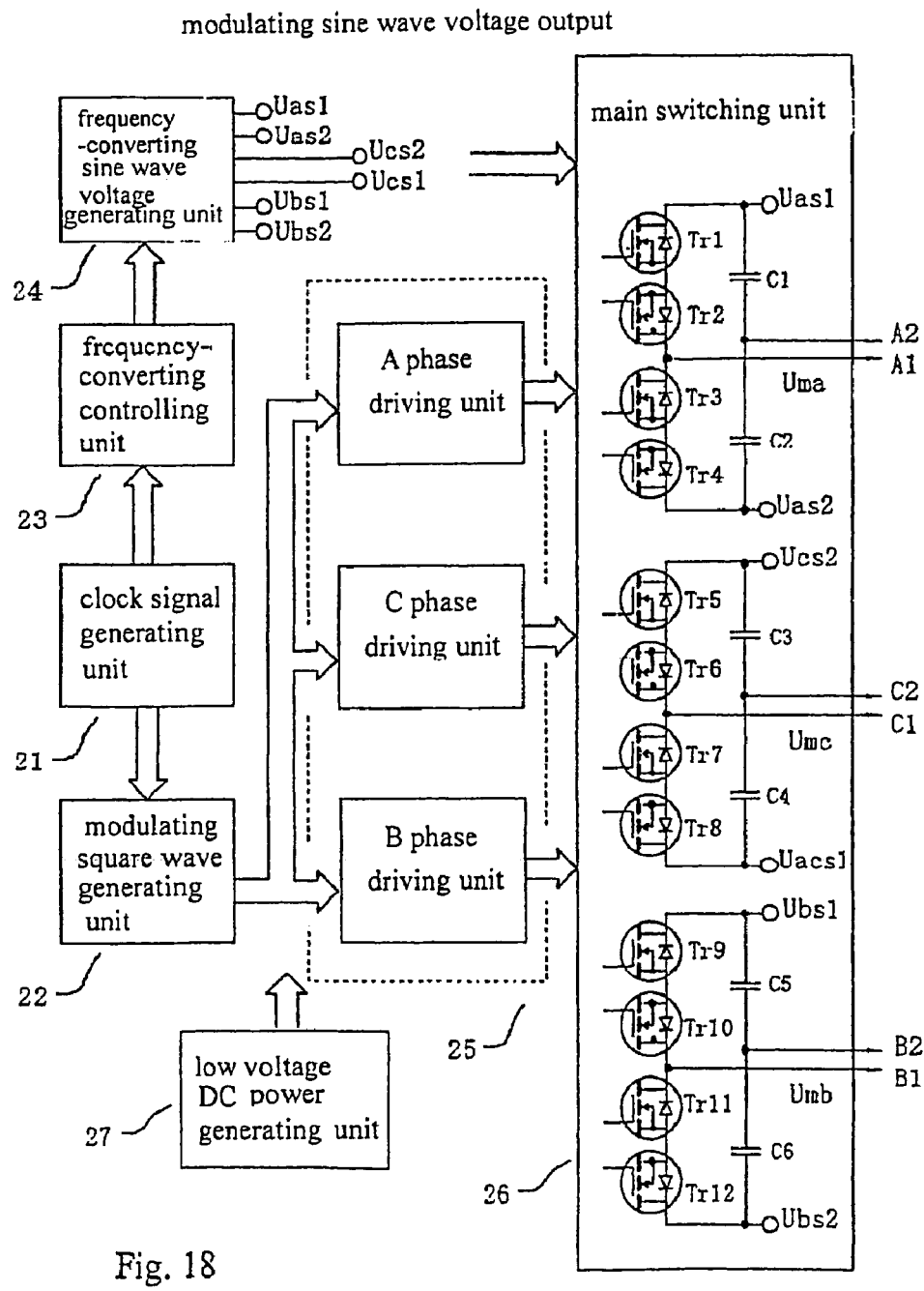

FIG. 18 is a block diagram of the pulse amplitude modulated excitation control circuit of the three-phase motor with 24 grooves and 4 pairs of poles as shown in FIG. 7. It can be seen from the drawing that the circuit is characterized in that: under the control of the synchronous signal output by the clock signal generating unit [21], the driving unit 25 is directly driven by the modulating square voltage output by the modulating square wave generating unit [22], the frequency-converting controlling unit [23] synchronized by the clock signal generating unit controls the frequency-converting sine wave voltage generating unit [24] to output three phases of frequency convertible modulating sine wave voltages Uas, Ubs, Ucs with sufficient power and amplitude. The modulating sine wave voltage and the modulating square wave output by the driving unit are subject to the amplitude modulation on power sine wave voltage in the main switching unit [26] by three groups of AC half-bridge switching circuits made up of 12 power field effect switching transistors and 6 capacitors, and then three phases of amplitude modulated excitation voltages are output from its output terminals A1, A2; C1, C2; B1, B2 respectively. The low voltage DC power generating unit [27] outputs DC low power to be used in the integrate circuit.

Obviously, the excitation control on pulse width modulation and pulse amplitude modulation in the two-phase motor with 16 grooves and 4 pairs of poles as shown in FIG. 1 can also be achieved in the same manner as described above. The present invention does not exclude other control circuits having equivalent functions as described above.

What is claimed is:

1. A switching pattern AC induction motor comprising a machine base, a stator and a rotor, said stator including a core of cylinder shape, stator teeth being disposed on the internal surface of said stator core in equal angles and extending inward along a radial direction with stator grooves penetrating along an axial direction between the teeth; the number of the stator grooves or teeth being determined by the following equation: $Z=2*M*P*Q$, where M being the number of phases of the excitation voltages, P being the number of pairs of stator poles, and Q being the number of grooves or teeth per pole per phase; excitation windings being disposed in the stator grooves, and the rotor of the motor being of a squirrel cage structure, wherein: said excitation windings on the stator of the motor being excited by a sine wave switching AC pulse modulated excitation voltages, and the number K of the metal conducting bars in the rotor 'squirrel cage' being twice of the number P of pairs of the stator poles, i.e. K=2P wherein, the sine wave switching AC pulse modulated excitation voltages are generated by performing pulse width modulation or pulse amplitude modulation on two phases of continuous modulating sine wave voltages with phase difference of 90° or three phases of continuous modulating sine wave voltages with phase difference of 120° with equal virtual values and frequencies, together with a pulse square wave voltage having a waveform of symmetric square wave with a duty factor of 50% of which the frequency (F2) is within the frequency range of voice or ultrasonic and much larger than the frequency (F1) of said continuous modulating sine wave voltages.

2. The motor according to claim 1, characterized in that,wherein metal conducting bars of the 'squirrel cage' being disposed along the axial direction and distributed at equal intervals in parallel with a cylindrical surface of the rotor.

3. The motor according to claim 1, wherein when the number of grooves or teeth per pole per phase is Q=1, the excitation windings on the stator adopt centralized windings with 1/M pole pitch or integral multiple pitch.

4. The motor according to claim 1, wherein when the number of grooves or teeth per pole per phase is Q>1, the excitation windings on the stator adopt distributed windings.

5. The motor according to claim 1, wherein the frequency (F1) of the continuous modulating sine wave voltages determines the rotation speed of the motor, and can be changed to perform speed control of the motor.

6. The motor according to claim 1, wherein the resistance of the excitation windings of the motor is proportional to the frequency (F2) of the pulse square wave voltage, and the higher F2 is, the smaller the size and mass of the stator core, the rotor core and the windings of the motor are.

7. The motor according to claim 1, wherein cores of the rotor and the stator are made by soft magnetic material laminations which meet corresponding frequency characteristics (F2) within the frequency range of the pulse square wave voltage, and subject to surface insulation treatment, then to piling along the axial direction, or made of ferrite materials with corresponding frequency characteristic as a whole or in a manner of sectioning along the axial direction.

* * * * *